United States Patent Office.

LEVI S. FALES, OF NEW YORK, N. Y., ASSIGNOR TO THE AMERICAN FERTILIZER COMPANY.

Letters Patent No. 97,182, dated November 23, 1869.

IMPROVED MODE OF RECOVERING THE SPENT ACID FROM OIL-REFINERIES.

The Schedule referred to in these Letters Patent and making part of the same.

*To all whom it may concern:*

Be it known that I, LEVI S. FALES, of the city, county, and State of New York, have invented a new and improved Method of Recovering Spent Acid from Oil-Refineries, &c.; and I do hereby declare that the following is a full, clear, and exact description of the same.

The object of this invention is to utilize or recover the acid ordinarily wasted in oil-refineries, thereby enabling such acid to be used again in any suitable industrial or other process.

The invention consists in a novel method of insuring the removal of the tarry matter and the like from the spent-acid solution, whereby the desired result is effectually secured.

To enable others to understand the nature of my invention, I will proceed to describe it.

In any ordinary or suitable closed boiler, I place any desired quantity of the ammoniacal liquor of gas-works.

This boiler, for the purpose presently herein explained, I connect with a separate lead-lined tank, by means of an appropriate pipe, or its equivalent.

In this tank, I place the spent-acid solution to be treated. The quantity of this may be greater or less, as desired; but to every fifteen hundred weight of such solution, I add, say, twenty-five pounds of sulphate of potash, or, in place of this, an equal quantity of sulphate of ammonia.

The object of adding the one or the other, as the case may be, of these materials, is to impart to the liquid a consistency, which is found, in practice, to be advantageous in carrying out the process of purification.

To the liquid thus prepared, should be added about one-half its weight of water.

These preliminaries having been attended to, heat is applied to the boiler containing the ammoniacal liquor, and ammoniacal vapors from the latter are driven over into the tank holding the spent acid.

The effect of the ammoniacal vapor upon the spent-acid solution is to cause the tarry matter suspended therein to rise to the surface and collect thereat in a layer or thickness.

This effect having been produced to the requisite degree, the influx of the ammoniacal vapors is shut off, and the solution allowed to rest for several hours, say from eight to twelve.

During this time, the layer of tarry matter agglutinates, and in its viscid condition may be removed bodily from the surface, leaving the solution in a comparatively clear and purified, but diluted condition.

In order to concentrate the thus purified liquid or solution, it is drawn off into pans, which should be lined with lead, in order to resist the corrosive action of the acid. These pans being arranged in connection with suitable furnaces, whereby the solution may be evaporated to about 60° Baumé, care should be taken to agitate the solution during the evaporating-process; and it is preferred to add, previous to the commencement of the latter, a quantity, say twenty-five pounds, of sulphate of soda for every fifteen hundred pounds of the spent acid originally employed.

It should also be mentioned, that when desired, the evaporation may be carried much further than above indicated, by the use of glass or platinum pans in the usual or any suitable manner.

The liquid or product resulting from the herein-described treatment of the spent acid from oil-refineries, while not absolutely pure, is sufficiently so to render it available for ordinary industrial purposes, as, for instance, the purification of petroleum, the manufacture of sulphate of ammonia, the fabrication of artificial manures, &c.

What I claim as my invention, and desire to secure by Letters Patent, is—

The within-described method of purifying or recovering the spent acid of oil-refineries, &c., by means of the ammoniacal liquors from gas-works, either with or without the use of the sulphate of soda, ammonia, or potash, substantially as herein set forth.

L. S. FALES.

Witnesses:
FRED. HAYNES,
R. E. RABEAU.